Jan. 26, 1926.
W. H. BAGLEY
PLUG GAUGE
Filed Nov. 30, 1923
1,571,154
FIG_1_
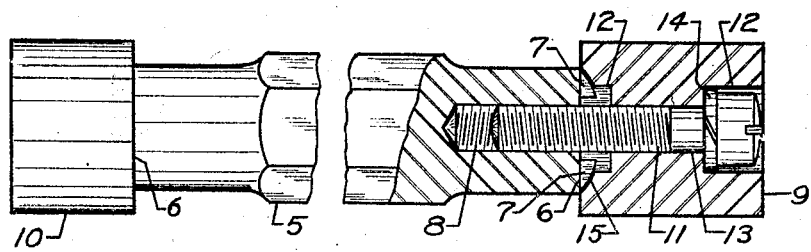
FIG_2_
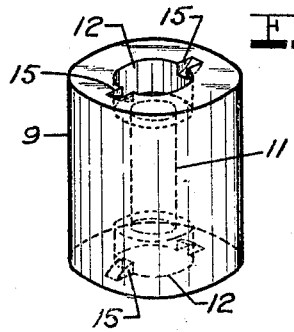
FIG_3_
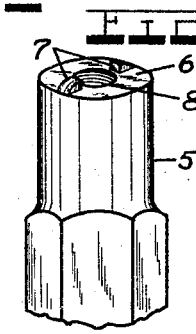
INVENTOR
WILLIAM H. BAGLEY
BY
*P. M. Pomeroy*
ATTORNEY Patented Jan. 26, 1926.

1,571,154

UNITED STATES PATENT OFFICE.

WILLIAM H. BAGLEY, OF DETROIT, MICHIGAN, ASSIGNOR TO THE STUDEBAKER CORPORATION, OF SOUTH BEND, INDIANA, AND DETROIT, MICHIGAN, A CORPORATION OF NEW JERSEY.

PLUG GAUGE.

Application filed November 30, 1923. Serial No. 677,817.

*To all whom it may concern:*

Be it known that I, WILLIAM H. BAGLEY, a citizen of the United States of America, and resident of Detroit, in the county of Wayne and State of Michigan, have invented certain new and useful Improvements in Plug Gauges, of which the following is a specification.

This invention relates broadly to tools, and more particularly to plug or thread gauges preferably of the "go" and "not go" type adapted for determining accurately predetermined dimensions of circular openings.

One object of this invention is to produce an accurate plug or thread gauge having interchangeable wearing surfaces, and of such construction that one handle may be interchangeable with a plurality of gauge heads.

Another object is to provide a simple, improved means for securing the gauge heads to the gauge handle together with improved means for preventing relative rotation of the gauging heads and handle.

A still further object of this invention is to provide a gauge of the type defined comprising few and simple parts of rugged construction not easily distorted, easily machined and economically manufactured.

The above being among the objects of the present invention, the same consists of certain features of construction and combination of parts to be hereinafter described and then claimed with reference to the accompanying drawing which illustrates a suitable embodiment of the present invention having the above and other objects in view.

Referring to the drawing:

Figure 1 is a fragmentary side elevational view of a gauge, certain of the parts being broken away and in section to more clearly show the construction.

Figure 2 is a perspective view of one of the gauge heads.

Figure 3 is a perspective view of one end of the gauge handle.

The use of double ended plug or thread gauges with reversible heads is conventional practice in shops where there is quantity production, for determining accurately predetermined dimensions of circular openings having either cylindrical or threaded walls. The type shown in the drawing is for use in connection with those openings having cylindrical walls, and is for the purpose of illustration only, as it is evident that the cylindrical gauge heads may be replaced by threaded heads without departure from the invention involved.

Such gauges are preferably double ended, that is, they have a gauge head on both ends, one of which is slightly larger in diameter than the other. The conventional practice is to make the diameter of one of the gauge heads the minimum diameter allowed for the hole to be tested, and the other gauge head the maximum diameter allowed for the hole to be tested. Thus the small gauge head must be capable of entering the hole while the large one must not and any articles having holes therein which must be within the limits of this gauge, and which do not conform to the above requirements, are rejected.

As illustrated in Figure 1, it is the conventional practice to make the "go" gauge head of greater length than the "not go" gauge head in order that the user may tell at a glance which has the large diameter and which the small, as the actual difference in diameter is usually so small as not to be discernible without the use of special instruments.

The gauge heads are preferably themselves reversible on the handles for the reason that after one end wears it may be reversed and the other end used, thus lengthening the life of each head.

It is also preferable that gauge heads of different diameter be adapted to fit the same handle, in order that the same be interchangeable and the cost reduced.

It is important that the heads thus secured to the handle must not move relative to it, or, in shop parlance, there must be no "shake" of the head on the handle. This is because in work of the accurate nature in connection with which these gauges are used, such a "shake" would be apt to lead the user of the gauge to believe that there was a freedom of movement between the gauge head and work when in reality there was not The above points have all been carefully considered in the gauge shown in the accompanying drawing and in the description like numerals refer to like parts throughout the several views. The handle 5 is provided at each end with a face 6 in a plane perpendicular to its axis (see Figure 3) and on each face 6 and projecting perpendicularly therefrom are two keys 7 preferably formed integral with said handle 5. Threaded openings 8, centrally disposed in respect to said faces 6, are provided in each end of the handle 5 and are axially disposed in respect to the handle 5.

Two gauge heads 9 and 10 are adapted to be secured to the ends of the handle 5. In the drawings the gauge head 9 may be presumed to be the "go" or small diameter gauge head and the gauge head 10 may be presumed to be the "not go" or large diameter gauge head. For the purpose of illustration only the gauge head 9 is shown in perspective in Figure 2, the gauge head 10 being of the same general construction but of less length; therefore a description of one will suffice for both.

The gauge head 9 has an axially disposed opening 11, the end portions of which are enlarged to form recesses 12. The size of the opening 11 is such as to accurately fit the screw 13 which passes through the head 9 and threads into the opening 8 to hold the head 9 to the handle 5 and the size of the recess 12 is such as to receive the head of the screw 13, and a lock-washer 14 placed thereunder, so that the same are within the end surfaces of the head 9. In each end of the head 9 are notches or key-ways 15, which may be formed by milling with a Woodruff keyway cutter or other suitable means, which are adapted to receive the keys 7 on the face 6. The keys 7 are adapted to accurately fit the sides of the key-ways 15 but do not contact with the same at any other points, and the head 9 is thus prevented from turning on the handle 5. The end surfaces of the head 9 seat against the face 6 and the head 9 is thus positioned perpendicularly to the same thereby, and the screw 11 accurately centers the head 9 on the handle 5 and secures it thereto. The lock-washer 14 prevents the screw 11 from working loose. The head 9 is therefore held against turning movement by the keys 7 engaging the keyways 15, and is held securely in central position and from axial movement by the screw 11.

It is evident that the recesses 12 are not of any material necessity for the proper functioning of the gauge itself, but are provided for the purpose of allowing the gauge to be stood on end, which is a matter of great convenience in handling.

The heads 9 and 10, being substantially uniform in shape in respect to their axes and also to a plane perpendicular to their axes through their center, are such as to not be affected by warping. The design as a whole is very simple, no difficult machining or fits being necessary in its construction, and results in a product desirable and advantageous to use.

Having thus described my invention, what I claim by Letters Patent is:—

1. A device of the character described, comprising a handle provided with an end face and an axial threaded opening; a key having a curved outer face integral with said handle projecting out from said face and forming the outer extremity of said handle; a gauge head provided with an axial opening and a key-way in each end face adapted to receive said key; and means extending through said axial opening in said gauge head and into said threaded opening in said handle for holding said head against said face.

2. A device of the character described comprising a handle provided with an end face having a threaded opening centrally disposed thereto; a key having a curved outer face projecting from said end face and forming the outer extremity of said handle; a gauge head provided with an axial opening and a keyway in each end conforming in shape with said key to receive the same; a bolt inserted through and closely engaging the axial opening in said head and threaded into said opening in said handle for aligning said axial openings and securing said head against the face of said handle.

3. A gauge comprising a handle provided with an end face having an opening centrally disposed thereto; a key extending from said handle beyond said face to form the outer extremity of said handle; a gauge head provided with an axial opening and a keyway in each end thereof to receive said key; the contacting surfaces of said key and keyway and the end faces of said handle and gauge head forming the sole contact between said members; and means inserted through the axial opening in said head and secured in said opening in said handle for aligning said openings and securing said head against the face of said handle.

4. A gauge comprising a handle having an end face and a threaded opening perpendicular to said face, diametrically opposed keys projecting from said face, said keys having substantially parallel side walls and a curved outer face, a gauge head provided with an axial opening and a keyway in its end surface conforming in shape to said keys and closely engaging the side walls of said keys, and means extending through the axial opening in said head and into said threaded opening in said handle to secure said head against the face of said handle.

5. A gauge comprising a gauge head and a handle, said handle having an end face, a threaded opening perpendicular thereto, and keys having substantially parallel side walls projecting from said end face, said gauge head provided with an axial opening having enlarged ends and recesses formed in the face of said head communicating with said enlarged openings, said recesses receiving said keys to prevent rotation of said head relative to said handle, and means to secure said head to said handle against longitudinal movement.

6. A gauge comprising a handle having an end face and a threaded opening perpendicular thereto, diametrically opposed keys having substantially parallel side walls projecting from said face, a gauge head provided with an axial opening having enlarged ends and recesses formed in the end faces thereof communicating with said enlarged openings to receive said keys and prevent rotation of said gauge head relative to said handle, and a screw having a head received in the enlarged opening in said handle opposite said keys, said screw accurately fitting and extending through said axial opening in said gauge head and engaging said threaded opening in said handle to secure said head against the face of said handle in axial alignment therewith.

Signed by me at Detroit, Michigan, U. S. A. this 26 day of Nov. 1923.

WILLIAM H. BAGLEY.